United States Patent
Li et al.

(10) Patent No.: US 11,203,552 B2
(45) Date of Patent: Dec. 21, 2021

(54) CERAMIC MATERIAL AND METHOD OF PREPARING THE SAME

(71) Applicant: University of Electronic Science and Technology of China, Chengdu (CN)

(72) Inventors: Enzhu Li, Chengdu (CN); Hongcheng Yang, Chengdu (CN); Chengli Sun, Chengdu (CN); Chaowei Zhong, Chengdu (CN); Shuren Zhang, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 119 days.

(21) Appl. No.: 16/712,960

(22) Filed: Dec. 12, 2019

(65) Prior Publication Data

US 2021/0002177 A1    Jan. 7, 2021

(30) Foreign Application Priority Data

Jul. 5, 2019    (CN) .......................... 201910603226.3

(51) Int. Cl.
| | |
|---|---|
| *C04B 35/495* | (2006.01) |
| *C04B 35/626* | (2006.01) |
| *C04B 35/64* | (2006.01) |
| *C04B 35/634* | (2006.01) |

(52) U.S. Cl.
CPC ........ *C04B 35/495* (2013.01); *C04B 35/6261* (2013.01); *C04B 35/6264* (2013.01); *C04B 35/63424* (2013.01); *C04B 35/64* (2013.01); *C04B 2235/326* (2013.01); *C04B 2235/3215* (2013.01); *C04B 2235/3409* (2013.01); *C04B 2235/3418* (2013.01); *C04B 2235/442* (2013.01); *C04B 2235/604* (2013.01); *C04B 2235/6567* (2013.01)

(58) Field of Classification Search
CPC .............. C04B 35/495; C04B 35/6261; C04B 35/6264; C04B 35/63424; C04B 35/64; C04B 2235/3215; C04B 2235/326; C04B 2235/3409; C04B 2235/3418; C04B 2235/442; C04B 2235/604; C04B 2235/6567

See application file for complete search history.

(56) References Cited

FOREIGN PATENT DOCUMENTS

KR            100444359 B1 *    8/2004 ............. C04B 35/14

OTHER PUBLICATIONS

KR100444359 translation (Year: 2004).*

* cited by examiner

*Primary Examiner* — Bryan D. Ripa
*Assistant Examiner* — Cameron K Miller
(74) *Attorney, Agent, or Firm* — Matthias Scholl P.C.; Matthias Scholl

(57) ABSTRACT

A ceramic material, including: $BaWO_{4-x}M_2CO_{3-y}BaO-zB_2O_3-wSiO^2$, where x=0-0.2 mole, y=0-0.05 mole, z=0-0.2 mole, w=0-0.1 mole, M represents an alkali metal ion selected from $Li^+$, $K^+$, $Na^+$, and x, y, z, and w are not zero at the same time.

3 Claims, 1 Drawing Sheet

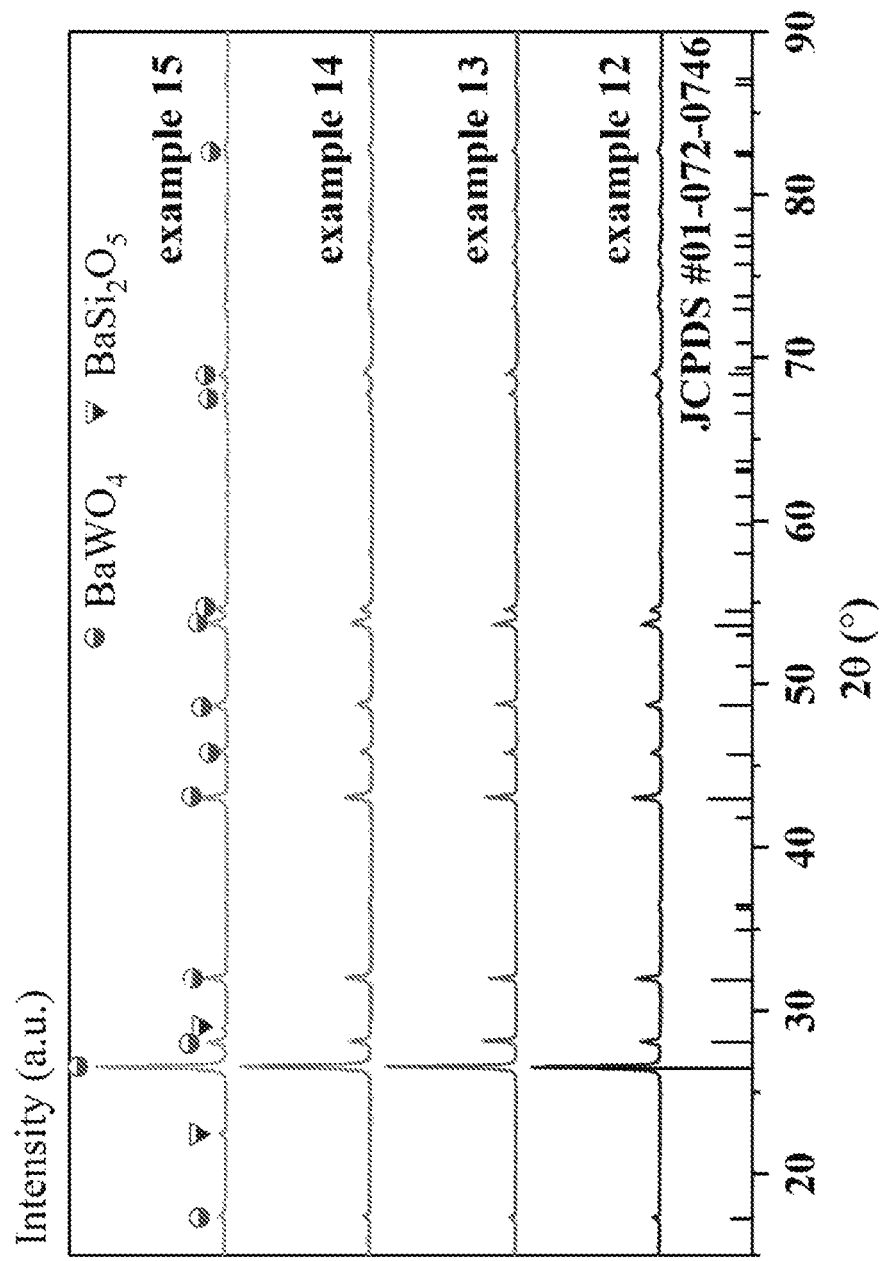

CERAMIC MATERIAL AND METHOD OF PREPARING THE SAME

CROSS-REFERENCE TO RELATED APPLICATIONS

Pursuant to 35 U.S.C. § 119 and the Paris Convention Treaty, this application claims foreign priority to Chinese Patent Application No. 201910603226.3 filed Jul. 5, 2019, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to low-temperature co-fired ceramics (LTCC), and more particularly to a ceramic material comprising $BaWO_4$ and a method of preparing the same.

Low-temperature co-fired ceramics are sintered at temperatures lower than the melting point of silver electrode (961° C.).

Conventionally, the sintering temperature of $BaWO_4$ ceramics is at least 1100° C.

SUMMARY

The disclosure provides a ceramic material, comprising: $BaWO_4$-$xM_2CO_3$-$yBaO$-$zB_2O_3$-$wSiO_2$, wherein x=0-0.2 mole, y=0-0.05 mole, z=0-0.2 mole, w=0-0.1 mole, M represents an alkali metal ion selected from $Li^+$, $K^+$, $Na^+$, and x, y, z, and w are not zero at the same time.

The ceramic material is prepared via a solid-state reaction. When y=0 and the sintering temperature is 850° C.-900° C., only $BaWO_4$ is observed. When y is not equal to 0, the main phase is $BaWO_4$, and the second phase is $BaSi_2O_5$. The microwave dielectric properties of the material are: $\varepsilon_r$=5.8-9.0, tan δ=3.70×10$^{-4}$, and $\tau_f$=−30−−10 PPM/° C.

A method of preparing the ceramic material comprises:
1) weighing and mixing $BaCO_3$, $WO_3$, $M_2CO_3$, $B_2O_3$ and $SiO_2$ based on a chemical formula $BaWO_4$-$xM_2CO_3$-$yBaO$-$zB_2O_3$-$wSiO_2$, wherein x=0-0.2 mole, y=0-0.05 mole, z=0-0.2 mole, w=0-0.1 mole, M represents an alkali metal ion selected from $Li^+$, $K^+$, $Na^+$, and x, y, z, and w are not zero at the same time, to yield a first powder;
2) mixing the first powder obtained in 1), zirconia balls, and deionized water according to a mass ratio of 1:5:1-2, ball-milling for 4-7 h, drying at 80-120° C., sieving with a 40-60 mesh sieve, calcining in air atmosphere at 700-900° C. for 2-4 h, to yield a second powder;
3) mixing the second powder obtained in 2), zirconia balls, and deionized water according to a mass ratio of 1:5:1-2, ball-milling for 3-6 h, drying, to yield a third powder, and adding a binder to the third powder; and
4) compression molding a resulting product obtained in 3) under a pressure of 20 megapascal, drying at 400-500° C. and sintering at 850° C.-900° C. for 0.5-2 h.

The sintering temperature of the ceramic material is just 850° C.-900° C.

BRIEF DESCRIPTION OF THE DRAWINGS

The invention is described hereinbelow with reference to accompanying drawings, in which the sole FIGURE shows the X-ray diffraction patterns of ceramic materials in Examples 12 to 15.

DETAILED DESCRIPTION OF THE EMBODIMENTS

To further illustrate, embodiments detailing a ceramic material are described below. It should be noted that the following embodiments are intended to describe and not to limit the disclosure.

The chemical formula of the ceramic material is: $BaWO_4$-$xM_2CO_3$-$yBaO$-$zB_2O_3$-$wSiO_2$, x=0-0.2 mole, y=0-0.05 mole, z=0-0.2 mole, w=0-0.1 mole, where M represents alkali metal ion selected from $Li^+$, $K^+$, $Na^+$, and x, y, z, and w cannot be equal to zero at the same time. The ceramic material is prepared via solid-state reaction method.

The raw materials are: $BaCO_3$, $WO_3$, $M_2CO_3$, $B_2O_3$ and $SiO_2$. This $BaWO_4$ ceramic is prepared via a solid-state reaction, comprising:
1) weighing and mixing $BaCO_3$, $WO_3$, $M_2CO_3$, $B_2O_3$ and $SiO_2$ based on a chemical formula $BaWO_4$-$xM_2CO_3$-$yBaO$-$zB_2O_3$-$wSiO_2$, wherein x=0-0.2 mole, y=0-0.05 mole, z=0-0.2 mole, w=0-0.1 mole, M represents an alkali metal ion selected from $Li^+$, $K^+$, $Na^+$, and x, y, z, and w are not zero at the same time, to yield a first powder;
2) mixing the first powder obtained in 1), zirconia balls, and deionized water according to a mass ratio of 1:5:1-2, ball-milling for 4-7 h, drying at 80-120° C., sieving with a 40-60 mesh sieve, calcining in air atmosphere at 700-900° C. for 2-4 h, to yield a second powder;
3) mixing the second powder obtained in 2), zirconia balls, and deionized water according to a mass ratio of 1:5:1-2, ball-milling for 3-6 h, drying, to yield a third powder, and adding a binder to the third powder; and
4) compression molding a resulting product obtained in 3) under a pressure of 20 megapascal, drying at 400-500° C. and sintering at 850° C.-900° C. for 0.5-2 h.

The microwave dielectric ceramics were prepared in the same procedures as described above. The relative dielectric constant and dielectric loss were measured with the Hakki-Coleman dielectric resonator method. The network analyzer (HP83752A, the United States) was switched to the TE011 mode. The $\tau_f$ value was calculated according to the examined resonant frequency at 25° C. and 85° C.

TABLE 1

Weights of raw materials in each example

| Examples | | 1 | 2 | 3 | 4 | 5 |
|---|---|---|---|---|---|---|
| Mass of each raw material/g | $BaCO_3$ | 22.774 | 23.279 | 23.073 | 23.176 | 22.572 |
| | $WO_3$ | 26.104 | 26.046 | 25.817 | 25.931 | 25.256 |
| | $Li_2CO_3$ | — | — | — | — | — |
| | $K_2CO_3$ | — | — | — | — | — |
| | $Na_2CO_3$ | — | — | — | — | — |
| | $B_2O_3$ | 0.784 | — | 0.775 | 0.389 | 1.517 |
| | $SiO_2$ | 0.338 | 0.675 | 0.335 | 0.504 | 0.655 |
| Sintering temperature | | | | 850° C. | | |

| Examples | | 6 | 7 | 8 | 9 | 10 |
|---|---|---|---|---|---|---|
| Mass of each raw material/g | $BaCO_3$ | 22.402 | 22.087 | 22.243 | 21.897 | 21.304 |
| | $WO_3$ | 25.676 | 25.316 | 25.495 | 25.099 | 24.418 |
| | $Li_2CO_3$ | 0.818 | — | — | 1.600 | — |
| | $K_2CO_3$ | — | 1.509 | — | — | 2.911 |

TABLE 1-continued

Weights of raw materials in each example

|  |  |  |  |  |  |  |
|---|---|---|---|---|---|---|
|  | $Na_2CO_3$ | — | — | 1.166 | — | — |
|  | $B_2O_3$ | 0.771 | 0.760 | 0.766 | 0.754 | 0.733 |
|  | $SiO_2$ | 0.333 | 0.328 | 0.330 | 0.650 | 0.633 |
| Sintering temperature |  |  |  | 875° C. |  |  |

| Examples |  | 11 | 12 | 13 | 14 | 15 |
|---|---|---|---|---|---|---|
| Mass of each raw material/g | $BaCO_3$ | 21.597 | 22.626 | 22.527 | 22.577 | 21.968 |
|  | $WO_3$ | 24.754 | 26.582 | 26.465 | 26.524 | 25.809 |
|  | $Li_2CO_3$ | — | 0.254 | — | — | — |
|  | $K_2CO_3$ | — | — | 0.473 | — | — |
|  | $Na_2CO_3$ | 2.263 | — | — | 0.364 | — |
|  | $B_2O_3$ | 0.743 | 0.399 | 0.397 | 0.398 | — |
|  | $SiO_2$ | 0.642 | 0.138 | 0.137 | 0.137 | 2.224 |
| Sintering temperature |  |  |  | 900° C. |  |  |

TABLE 2

Microwave dielectric properties of ceramic material in each example

| Examples | External diameter (mm) | Thickness (mm) | εr | Tanδ ($10^{-4}$) | Q × f (GHz) | $\tau_f$ (ppm/° C.) |
|---|---|---|---|---|---|---|
| 1 | 11.01 | 6.99 | 8.69 | 4.58 | 20201 | −24.10 |
| 2 | 10.75 | 6.37 | 8.24 | 4.98 | 19712 | −26.56 |
| 3 | 10.71 | 6.65 | 8.11 | 4.67 | 20144 | −21.14 |
| 4 | 10.80 | 6.25 | 8.13 | 4.70 | 20679 | −22.36 |
| 5 | 10.66 | 5.66 | 7.06 | 5.14 | 21330 | −20.02 |
| 6 | 10.79 | 5.95 | 6.88 | 5.28 | 21988 | −20.56 |
| 7 | 10.82 | 5.83 | 6.69 | 6.12 | 18423 | −22.37 |
| 8 | 10.69 | 6.07 | 7.32 | 6.33 | 17467 | −23.22 |
| 9 | 10.83 | 6.17 | 6.25 | 4.37 | 24768 | −15.13 |
| 10 | 10.76 | 5.87 | 6.00 | 4.80 | 22425 | −12.71 |
| 11 | 10.61 | 6.25 | 6.60 | 4.33 | 23371 | −19.36 |
| 12 | 10.99 | 5.63 | 8.15 | 5.58 | 23371 | −25.10 |
| 13 | 11.02 | 5.55 | 8.30 | 3.98 | 32712 | −26.56 |
| 14 | 10.70 | 6.06 | 7.98 | 7.23 | 17864 | −21.14 |
| 15 | 10.50 | 5.65 | 7.50 | 3.70 | 37296 | −22.36 |

According to the tables, when the ceramics were sintered at 850° C.-900° C. for 0.5 h, all the samples possessed excellent properties, indicating that the materials can be applied to LTCC technology.

The sole FIGURE represents the XRD patterns of ceramics (examples 12, 13, 14 and 15) sintered at 900° C. for 0.5 h. As shown, for y=0, only $BaWO_4$ (JCPDS #01-072-0746) was observed, while in Example 15, $BaWO_4$ (JCPDS #01-072-0746) and $BaSi_2O_5$ were detected.

It will be obvious to those skilled in the art that changes and modifications may be made, and therefore, the aim in the appended claims is to cover all such changes and modifications.

What is claimed is:

1. A ceramic material, comprising: $BaWO_4\text{-}xM_2CO_3\text{-}yBaO\text{-}zB_2O_3\text{-}wSiO_2$, wherein x=0-0.2 mole, y=0-0.05 mole, z=0-0.2 mole, w=0-0.1 mole, M represents an alkali metal ion selected from $Li^+$, $K^+$, $Na^+$, and x, y, z, and w are not zero at the same time.

2. A method, comprising:

1) weighing and mixing $BaCO_3$, $WO_3$, $M_2CO_3$, $B_2O_3$ and $SiO_2$ based on a chemical formula $BaWO_{4\text{-}x}M_2CO_3\text{-}yBaO\text{-}zB_2O_3\text{-}wSiO_2$, wherein x=0-0.2 mole, y=0-0.05 mole, z=0-0.2 mole, w=0-0.1 mole, M represents an alkali metal ion selected from $Li^+$, $K^+$, $Na^+$, and x, y, z, and w are not zero at the same time, to yield a first powder;

2) mixing the first powder obtained in 1), zirconia balls, and deionized water according to a mass ratio of 1:5:1-2, ball-milling for 4-7 h, drying at 80-120° C., sieving with a 40-60 mesh sieve, calcining in air atmosphere at 700-900° C. for 2-4 h, to yield a second powder;

3) mixing the second powder obtained in 2), zirconia balls, and deionized water according to a mass ratio of 1:5:1-2, ball-milling for 3-6 h, drying, to yield a third powder, and adding a binder to the third powder; and 4) compression molding a resulting product obtained in 3) under a pressure of 20 megapascal, drying at 400-500° C. and sintering at 850° C.-900° C. for 0.5-2 h.

3. The method of claim 2, wherein the binder is an acrylic solution.

* * * * *